Figure 1:
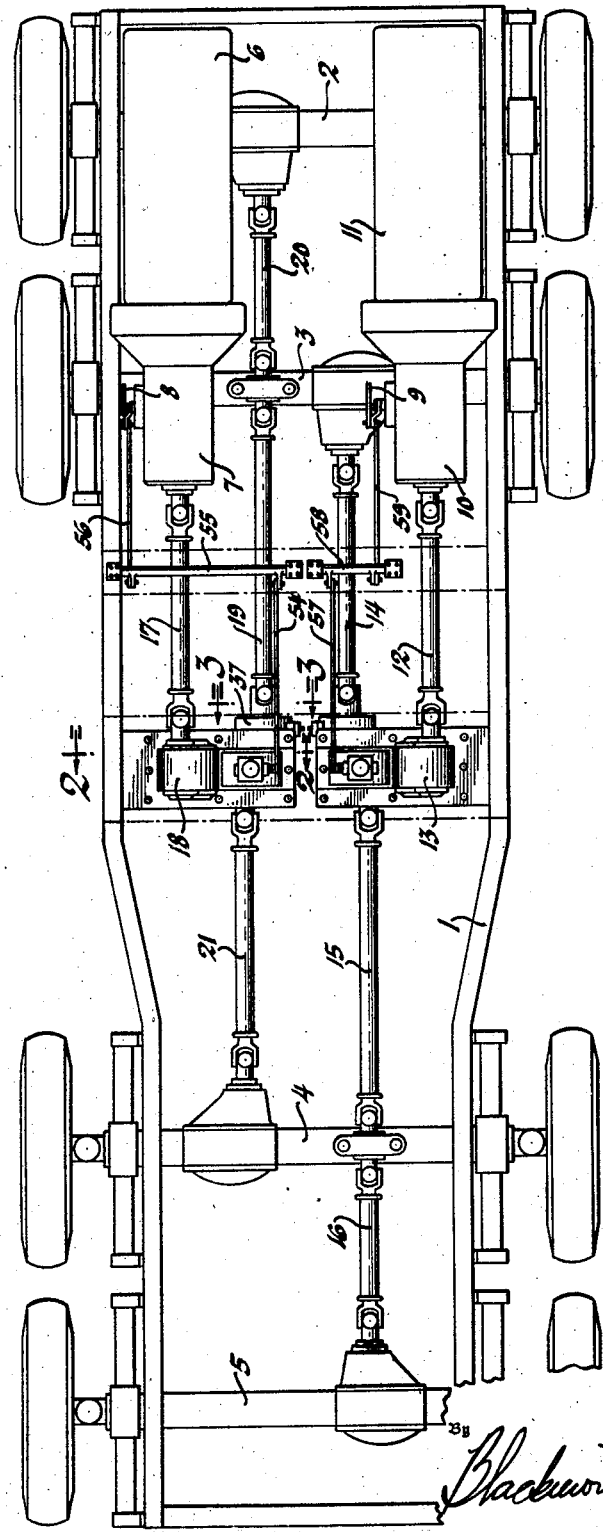

July 25, 1944.  C. J. BOCK  2,354,300
TRANSFER CASE FOR POWER TRANSMISSIONS
Filed June 3, 1942  3 Sheets-Sheet 1

Inventor
Carl J. Bock
By
Blackmor, Spencer & Flint
Attorneys

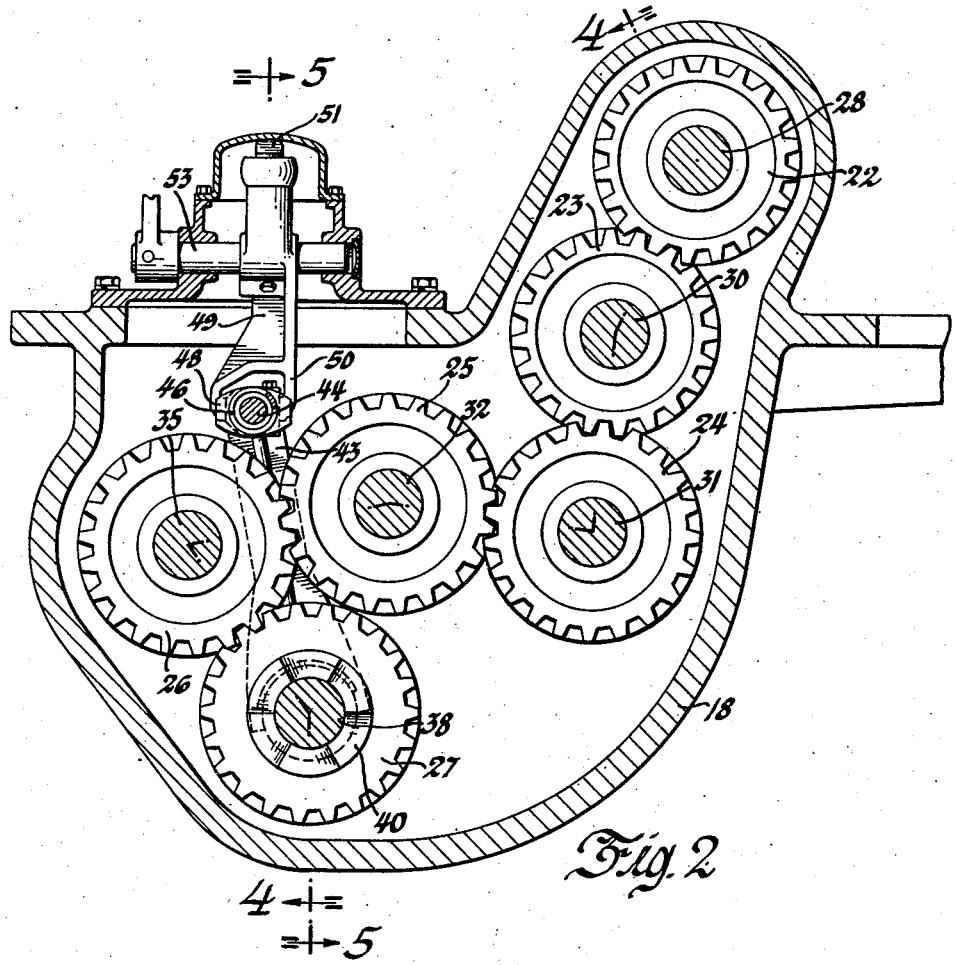
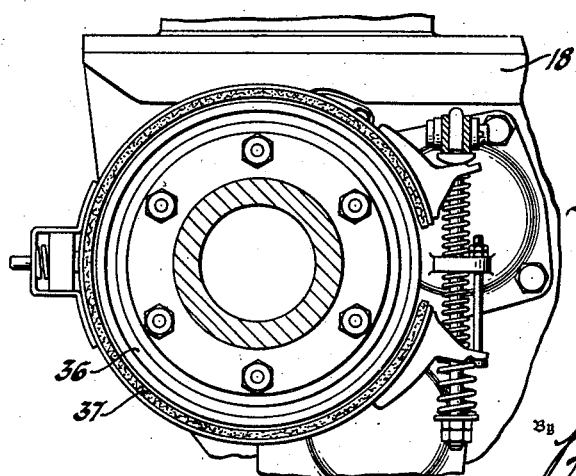

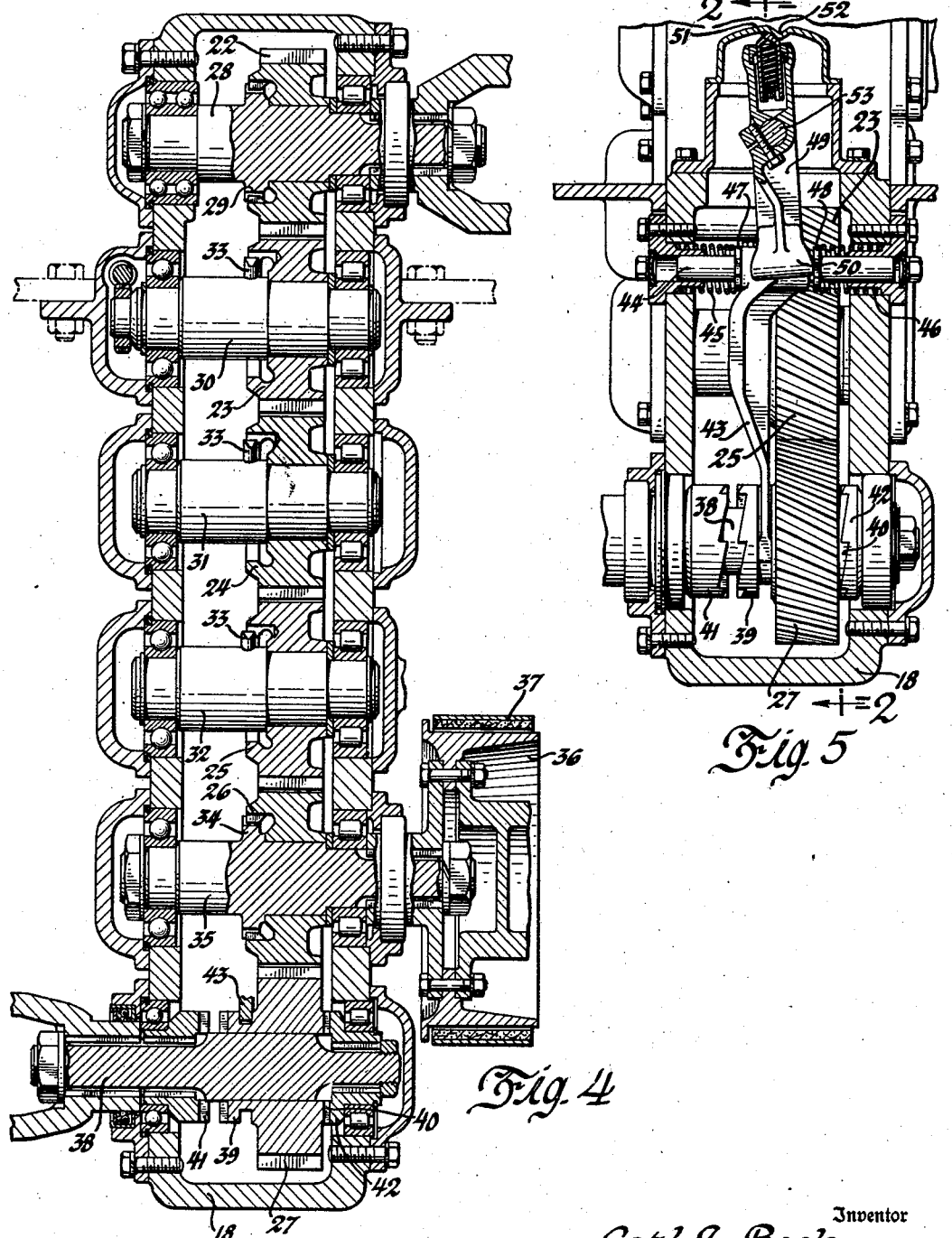

Patented July 25, 1944

2,354,300

UNITED STATES PATENT OFFICE 2,354,300

TRANSFER CASE FOR POWER TRANSMISSIONS

Carl J. Bock, Birmingham, Mich., assignor, by mesne assignments, to General Motors Corporation, Detroit, Mich., a corporation of Delaware Application June 3, 1942, Serial No. 445,627

13 Claims. (Cl. 180—23)

This invention relates to multiple drive axle vehicles and more particularly to road vehicles having steerable front wheels which can be driven to augment normal drive through the rear wheels under unusual operating conditions.

A type of vehicle for which the improved structure is especially adapted is the military combat car having eight road wheels arranged in two sets and on a pair of tandem rear drive axles and a pair of tandem front steerable drive axles with a power plant to drive one of the rear axles and one of the front axles and a companion power plant to drive the remaining front and rear axles. In such arrangement each power plant includes an internal combustion engine and a variable speed transmission having selective forward and reverse drive settings together with a transfer mechanism through which power from the transmission is divided between front and rear exles.

According to the present invention the transfer mechanism is coupled solidly with the rear axle at all times and incorporates an overrunning clutch drive to the front axle. Two one-way clutches are employed, one for forward drive and the other for reverse drive, and clutch selection is effected conjointly with the forward and reverse settings of the variable speed transmission. In a preferred embodiment, clutch selection consists essentially of taking out of action either one of a pair of opposing springs so that the force of the other spring assists in establishing coupled relation of the desired set of clutching elements. More particularly the selector springs serve to condition the parts for positive clutch settings and remove the uncertainty of instant and complete drive coupling. Inertia or other forces which otherwise might interfere are effectively overcome by the spring pressure.

Multiple axle drive is always available automatically when needed. Drive through all axles generally is required only when the rear solidly coupled axle tends to overrun the front axle, as when operation in soft ground or under heavy load causes the rear traction wheel to slip or spin. The one-way clutch then picks up the drive and directs it to the front axle without calling on the car operator for attention. Ordinarily when the vehicle is traveling at reasonably fast speed on smooth pavement the front axle slightly overruns the rear axle and drive through the rear axle alone is sufficient and desirable for ease and safety in steering. The slight overrun occurs normally because the front steerable wheels travel in longer arcs than the trailing wheels. Of course, if the rear wheels would exactly track the front wheels there could be no overrun in the absence of rear wheel slip, but as a practical matter exact tracking seldom occurs and even on straight stretches of highway the vehicle driver ordinarily is operating the steering gear all the time the vehicle is moving. However, the important fact is that the mechanism operates automatically to afford multiple axle drive for hard pulling and to disconnect steering axle drive for safe high speed steering on sharp curves.

For a better explanation of the novel features reference will be made to a preferred embodiment illustrated in the accompanying drawings wherein Figure 1 is a plan view showing the general layout of a two engine multiple drive axle arrangement; Figures 2 and 3 are enlarged sectional views taken on lines 2—2 and 3—3, respectively, of Figure 1; Figure 4 is a sectional view of the power divider taken on line 4—4 of Figure 2 and Figure 5 is a section on line 5—5 of Figure 2.

For the purpose of illustration the attached drawings show the usual chassis frame assembly I supported by any suitable spring arrangement upon four axles, each including a differential and road wheels on opposite ends. In the case of an armored combat car of the tank type the bottom of the body hull, instead of a conventional chassis frame, can be spring supported on the axles. The longitudinal spacing between the axles may be varied to suit design requirements but in any event in the case of a four axle vehicle, there would be involved a rearward rear axle 2 and a forward rear axle 3 together with a rearward front axle 4 and a forward front anxle 5, each of the front axles having its road wheels swiveled on the usual kingpins. The steerable wheels, of course, need to be interconnected by steering linkage of suitable type. At the rear of the vehicle two power plants are mounted in side-by-side relation. The power plant on the right-hand side of the vehicle includes the engine 6 and a variable speed transmission 7. The variable speed transmission proposed for use is of an automatic type known in the automotive trade as the Hydra-Matic transmission and having selective settings from neutral position to forward speed and reverse drive. For effecting manual setting of the transmission, a rockshaft extends through one casing side wall with a crank arm connected by linkage, a part of which is shown at 8, leading to an operating lever (not shown) at the driver control station. Either the same or a similar hand control lever is connected by linkage indicated partially by the numeral 9 for setting a similar transmission unit 10 forming in connection with the internal combustion engine 11, the power plant on the left-hand side of the vehicle. The output end of the transmission 10 is connected by a universally jointed propeller shaft 12 to the power divider mechanism enclosed within a casing 13. The drive from the divider 13 is rearwardly through a propeller shaft 14 to the forward rear axle 3 and is sent forwardly through the jointed propeller shaft sections 15 and 16 to the forward front axle 5. Power from the companion transmission mechanism 7 is delivered through a universally jointed propeller shaft 17 to the transfer case 18 where it is divided and sent through the jointed propeller shaft sections 19 and 20 to the rearmost rear axle 2 and through the jointed propeller shaft 21 to the rearward front axle 4.

Except for their arrangements to fit the right and left-hand sides of the vehicle, transfer casings 13 and 18 and their included mechanisms are identical in structure. Each includes a train of intermeshing helical gears numbered 22, 23, 24, 25, 26 and 27 arranged as shown in Figure 2 for transmitting the drive from the engine to the axles in one-to-one ratio and for presenting the output drive shafts in axial alignment with the respective axle differentials to be driven. As best indicated in Figure 4, all of the gears except that numbered 27 are of identical design in order to promote interchangeability and low cost production. Each gear is mounted on a supporting shaft which in turn is rotatable in suitable bearings secured in alignment in openings in opposite walls of the casing, with conventional cover caps for the openings. The input shaft 28 to be driven from the power plant is formed with external teeth 29 fitted to internal teeth on the gear 22. Inasmuch as the supporting shafts 30, 31 and 32 for the gears 23, 24 and 25, respectively, transmit no torque load, the cost of forming external teeth thereon is eliminated by fitting each shaft with a radial stud or pin 33 to engage the internal teeth of its supported gear and thus key the gear on the rotatable supporting shaft. The drive gear 26 has its internal teeth fitted to external teeth 34 on the drive shaft 35 which extends rearwardly through the wall of the casing for solid drive coupling with a rear driving axle. If desired the coupling between the drive shaft 35 and its driven propeller shaft may include a parking brake drum 36 for cooperation with a contractible brake band 37.

A front axle propeller shaft is coupled with the drive shaft 38 having bearing support in opposite walls of the divider casing and loosely mounting thereon the axially shiftable drive gear 27. On opposite faces of the slider gear 27 are formed the ratchet tooth one-way clutching elements 39 and 40, respectively, which are adapted to be coupled selectively with complementary clutching elements 41 and 42 fixed on the drive shaft 38 in axially spaced apart relation on opposite sides of the slider gear 27. The clutching elements 40 and 42 provide a one-way drive for forward speed when the drive gear 27 is urged toward the right in the drawings, while the clutching elements 39 and 41, with the gear 27 shifted to the left, provide one-way drive for reverse speed operation of the vehicle. In either speed setting the drive from the engine is transmitted solidly to the rear axle and through the overrunning clutch to the front axle in the event the traction wheels on the rear axle tend to overrun the steerable wheels on the front axle.

It has been found that driving thrust of the helical gears alone is unreliable for obtaining instant smooth transfer of drive and a nicely full fitted ratchet tooth engagement. Especially under critical operating conditions which compel or result in sudden changes in power or brake application, the behavior of a free floating gear becomes erratic and the ratchets are not always in position to pick up front axle drive. A slight constant pressure is needed to produce a workable structure and insure proper driving relation. The necessary assisting force can be had with the use of spring pressure. To provide for the application of spring force selectively in either direction the slider gear 27 is formed with an annular groove to which is fitted a shifter fork 43 enclosed within the transfer casing and having its head mounted on a shift rod 44 slidable in bearings in opposite walls of the casing. A pair of coil springs 45 and 46 surrounding the rod 44 are arranged in opposition to each other and bear at their inner ends on thrust washers 47 and 48, respectively. These washers loosely encircle the shift rod 44 and in the intermediate or neutral position of the parts engage on opposite ends of the head of the shifter fork 43. If the balance of the springs is disturbed, as by taking either out of action, the remaining active spring will then urge the shifter rod 43 to one side or the other as the case may be to establish forward or reverse selection and condition the drive for one-way clutching relation between the drive gear 27 and drive shaft 38.

For controlling selection of the forward clutching elements 40 and 42 and reverse clutching elements 39 and 41, Figure 5 shows a rock lever 49 having a forked head 50 at its free end to extend between and engage the bearing washers 47 and 48. Rocking of the lever 49 in the counterclockwise direction, as seen in Figure 5, moves the bearing washer 48 to compress the spring 46 out of action on the shift 43, while movement in the opposite direction will deflect the resilient spring 45 and allow the spring 46 to come into action. The lever 49 may be retained in either position by mounting in its opposite end a spring pressed detent 51 adapted to ride over and engage on opposite sides of a locating abutment 52 forming a fixed part of the housing cover. The rock lever 49 is fixed or keyed on an operator controlled shaft 53 which extends through the wall of the transfer casing and carries a crank arm for connection preferably with the control linkage of the variable speed transmission whereby the forward and reverse setting of the transmission simultaneously effects a corresponding setting in the power divider. As seen in Figure 1 the interconnecting linkage for the selector mechanism in the transfer box 13 includes a link 54 connected to a transverse rockshaft 55 in turn joined by a link 56 with the control linkage 8. Similarly a link 57 connects the control mechanism for the transfer case 13 with a transverse rockshaft 58 from which a link 59 leads to the transmission control linkage 9.

I claim:

1. In a power divider, a train of gears, a primary drive shaft solidly coupled to one of said gears, a second drive shaft floatingly mounting another of said gears shiftable axially thereon and having spaced forward and reverse one-way clutching elements on opposite sides of the gear, a shifter device engageable with the gear for shifting the same selectively into coupled relation with either of said spaced clutching elements, a pair of opposed spring devices active together to center said shifter in neutral position and means to render one or the other of the spring devices wholly inactive for biasing the shifter to selected clutch coupling relation solely under the influence of the contacting active spring device.

2. In a power transmitting device of the character described, a pair of overrunning drive clutch devices arranged for forward drive setting and reverse drive setting respectively, a selector member operable on said devices to select either forward or reverse drive settings, spring means arranged resiliently to urge the selector member into forward drive setting, other spring means arranged resiliently to urge the selector member into reverse drive setting and control mechanism divorced from direct motion transmitting connection with the selector member and operable on said spring means to enable selective operation of the selector member.

3. In a power transmitting device of the character described, a pair of overrunning drive clutch devices arranged for forward drive setting and reverse drive setting respectively, a selector member operable on said devices to select either forward or reverse drive settings, a pair of springs active on the selector member in opposition to one another to balance the selector member in neutral setting and means operative on said springs to throw them out of neutral balancing relation and effect resilient biasing of the selector member to one or the other of the drive setting relations solely under spring influence and without direct connection between the selector member and said means.

4. A power divider between a pair of drive shafts operable in either forward or reverse directions, including a solid take off for one shaft, a forward overrunning clutch and a reverse overrunning clutch for the other shaft, a clutch selector operative to establish drive setting of either of said clutches, resilient means active to bias the selector to forward setting, other resilient means active to bias the selector to reverse setting and means independent of said selector and common to both resilient means to control the action thereof.

5. A power divider between a pair of drive shafts operable in either forward or reverse directions, including a solid take off for one shaft, a forward overrunning clutch and a reverse overrunning clutch for the other shaft, and mechanism for selectively drive coupling one or the other of said overrunning clutches by placing elastic pressure on the selected overrunning clutch and which pressure yields to accommodate the overrunning action while constantly maintaining operative spring pressure, comprising a clutch selector operable in opposite directions to establish driving operation of one or the other of said clutches, a pair of springs arranged for action on the selector in opposition to one another and means to remove the action of either spring on said selector for selective spring pressure actuation of the selector solely through the elastic force exerted thereon by the active spring.

6. In a power divider for both forward and reverse drive, a primary output shaft having a drive gear solidly coupled therewith, a second output shaft having a pair of axially spaced ratchet tooth clutch elements for forward drive and reverse drive respectively, a drive gear having ratchet tooth clutch elements on opposite sides complemental to the first mentioned clutch elements and being axially shiftably mounted loosely on the shaft for adjustment in one direction to couple the forward drive clutch elements and for adjustment in the opposite direction to couple the reverse drive clutch elements, a shifter operatively connected with the drive gear, a pair of resilient members arranged to exert opposing forces on the shifter, one directing the shifter in one direction and the other directing the shifter in the opposite direction and means operable selectively on said members to render either one inactive, said means having no operative connection with the shifter and being operable solely on said members.

7. In a power drive arrangement, a transmission having forward and reverse drive settings and control mechanism for selecting the drive setting, a power divider through which delivery of driving power from the transmission is transferred to a pair of drive shafts, and in which the drive to one of said shafts includes an overrunning clutch operative for forward speed setting and an overrunning clutch operative for reverse speed setting, control mechanism for selectively setting said clutches for drive through one or the other thereof, and means interconnecting the last mentioned control mechanism with the first mentioned control mechanism for conjoint operation of the mechanisms in their selection of forward and reverse settings respectively.

8. In a power drive arrangement, a transmission having forward and reverse drive settings and control mechanism for selecting the drive setting, a power divider for transferring the drive from the transmission to a plurality of drive shafts, a pair of one-way clutches independently operable to transmit drive to one of the shafts, one for forward drive and the other for reverse drive, a selector operatively associated with said clutches, a pair of opposed springs acting on the selector and serving to urge the selector to forward or reverse settings respectively, means to render either spring ineffective for selector actuation under influence of the other spring and an interconnection between said means and said transmission control mechanism to compel unison selection of forward and reverse settings for the transmission and divider.

9. In a multiple axle vehicle, a set of front steering drive axles and a set of rear drive axles, a pair of power plants each including an engine, a selective forward and reverse transmission and a power divider for transferring engine power from its transmission to at least one of the rear axles and to at least one of the front axles with said power dividers with respect to each other being drive connected to different front and rear axles, each power divider having solid drive connection with its driven rear axle and a one-way drive connection with its driven front axle and said one-way drive connection including a pair of overrunning clutches, one operative for forward drive and the other for reverse drive, a selector for controlling the operative setting of the respective clutches and means responsive to the selective forward and reverse setting of the transmission for regulating said selector.

10. In combination, a power transmission having forward and reverse drive settings, drive selector mechanism therefor, a power divider driven from the transmission including a pair of output shafts, a driven gear shiftably mounted on one of said shafts, a forward drive one-way clutch and a reverse drive one-way clutch, both fixed on said shaft and in axially spaced relation on opposite sides of the driven gear for selective coupling thereto, resilient biasing means active on said gear to shift the same into coupling relation with the forward drive one-way clutch, other resilient biasing means active on the gear to shift the same into coupling relation with the reverse drive one-way clutch, means to unload one or the other of said resilient biasing means, and means operatively connecting said unloading means with the forward and reverse drive selector mechanism of said power transmission.

11. In combination, a driven shaft having fixed thereon in axially spaced relation, a right-hand one-way driver and a left-hand one-way driver, a floating driving gear rotatably and shiftably mounted on the shaft between said one-way drivers and provided with one-way drivers on opposite faces thereof to mate with the aforesaid one-way drivers, a gear shifter member operable in opposite directions to carry said gear axially into either right-hand or left-hand one-way driver coupling relation, a pair of opposed springs engaging the shifter member in bucking relation and tending to center the gear in non-driving relation to both drivers and means operable, without direct connection on the shifter member, to deflect the opposing force of either spring selectively and enable the resilient force of the other spring to establish one-way drive connection between the driving gear and driven shaft.

12. In combination, a driven shaft having fixed thereon in axially spaced relation, a right-hand one-way driver and a left-hand one-way driver, a floating driving gear rotatably and shiftably mounted on the shaft between said one-way drivers and provided with one-way drivers on opposite faces thereof to mate with the aforesaid one-way drivers, a gear shifter member operable in opposite directions to carry said gear axially into either right-hand or left-hand one-way driver coupling relation, resilient biasing means active on said shifter in opposite directions to center the same in non-driving neutral position and means operable, without direct action on the shifter member, to cancel the action of the biasing means in one direction or the other for selectively conditioning the parts for drive through either the right-hand or the left-hand one-way driver.

13. In combination, a driven shaft having fixed thereon in axially spaced relation, a right-hand one-way driver and a left-hand one-way driver, a floating driving gear rotatably and shiftably mounted on the shaft between said one-way drivers and provided with one-way drivers on opposite faces thereof to mate with the aforesaid one-way drivers, helical driven teeth on said gear which set up a torque thrust toward the right or the left depending on rotational drive direction of said gear and tend to bias the gear toward one-way driver coupling in either case, and means to supplement said torque thrust including a pair of operating members exerting resilient forces in opposite directions on said gear and a control device therefor independent of direct connection with the gear and operably related to the rotative drive direction of said gear to unbalance the member exerting forces on said gear.

CARL J. BOCK.